(12) United States Patent
Baldwin

(10) Patent No.: US 11,796,976 B2
(45) Date of Patent: Oct. 24, 2023

(54) HVAC CONTROL USING HOME AUTOMATION HUB

(71) Applicant: Reid Alan Baldwin, Linden, MI (US)

(72) Inventor: Reid Alan Baldwin, Linden, MI (US)

( * ) Notice: Subject to any disclaimer, the term of this patent is extended or adjusted under 35 U.S.C. 154(b) by 0 days.

(21) Appl. No.: 17/529,851

(22) Filed: Nov. 18, 2021

(65) Prior Publication Data

US 2023/0152767 A1 May 18, 2023

Related U.S. Application Data

(60) Provisional application No. 63/199,224, filed on Dec. 15, 2020.

(51) Int. Cl.
| G05B 19/042 | (2006.01) |
| H04W 76/10 | (2018.01) |
| H04L 12/28 | (2006.01) |

(52) U.S. Cl.
CPC ........ *G05B 19/042* (2013.01); *H04L 12/2803* (2013.01); *H04W 76/10* (2018.02); *G05B 2219/2614* (2013.01)

(58) Field of Classification Search
CPC .......... G05B 19/042; G05B 2219/2614; H04L 12/2803; H04W 76/10
See application file for complete search history.

(56) References Cited

U.S. PATENT DOCUMENTS

| 7,243,004 | B2 | 7/2007 | Shah et al. |
| 10,126,009 | B2 | 11/2018 | Flaherty et al. |
| 2008/0147242 | A1 | 6/2008 | Roher et al. |
| 2010/0314458 | A1* | 12/2010 | Votaw ..................... F24F 11/77 165/45 |
| 2011/0155354 | A1 | 6/2011 | Karamanos |
| 2014/0041846 | A1 | 2/2014 | Leen et al. |
| 2014/0349566 | A1 | 11/2014 | Lamb |
| 2017/0051925 | A1* | 2/2017 | Stefanski ............... G05B 15/02 |
| 2017/0199515 | A1* | 7/2017 | Bhat ........................ G05B 9/03 |
| 2019/0154298 | A1 | 5/2019 | Zelczer et al. |
| 2019/0242605 | A1 | 8/2019 | Shekhar Nalajala et al. |
| 2021/0140668 | A1* | 5/2021 | Joseph ..................... F24F 11/54 |

* cited by examiner

*Primary Examiner* — Michael W Choi
(74) *Attorney, Agent, or Firm* — Brooks Kushman P.C.

(57) ABSTRACT

A zoned heating, ventilation, and air conditioning system is controlled via a home automation hub. The home automation hub communicates commands to an air handler via either a zoning interface module or a specially adapted thermostat. The zoning interface module or specially adapted thermostat are programmed to send commands to the air handler based on a default strategy whenever communication with the hub is lost, thereby mitigating the impact of a hub failure of communications failure. The zoning interface module additionally forwards commands from the hub to zone dampers. A user may conveniently indicate the type of equipment by inserting a removable terminal label from a set of provided removable terminal labels.

11 Claims, 11 Drawing Sheets

HVAC CONTROL USING HOME AUTOMATION HUB

CROSS-REFERENCE TO RELATED APPLICATIONS

This application claims priority to U.S. Provisional Application 63/199,224 filed Dec. 15, 2020, the entire disclosure of which is incorporated by reference herein.

TECHNICAL FIELD

This disclosure relates to the field of Heating, Ventilation, and Air Conditioning (HVAC) systems. More particularly, it relates to HVAC system controlled using a home automation hub.

BACKGROUND

FIG. 1 illustrates an air handler 20, which is the heart of a forced air Heating, Ventilation, and Air Conditioning (HVAC) system. An air handler 20 includes a blower 22 which draws air from return ductwork 24 and propels it through at least one heat exchanger and through supply ductwork 26 to various rooms in a building. In the air handler illustrated in FIG. 1, there are two heat exchangers: a furnace 28 to heat the air during cold weather and an air conditioning evaporator 30 to cool the air during hot weather. Only one of the two heat exchangers are typically used at a time. (Defrost of heat pump outdoor units may be an exception.) In climates that do not need both heating and cooling, one of the two heat exchangers may not be present. Also, some air handlers use a heat pump heat exchanger which can alternately provide either heating or cooling.

The air handler also includes controls 32 which receive signals indicating when to provide heating, cooling, or fan. As will be discussed later, these signals may come directly from a thermostat or may come from a zone controller. If air conditioning is demanded, or heat from a heat pump is demanded, the controller will send signals to a compressor unit that is located outdoors. In response, the compressor will circulate refrigerant through refrigerant lines 34 to the evaporator 30.

Some air handlers provide two stages of heating, cooling, or both. The first stage usually provides about 60% as much heating or cooling capacity as the second stage, although the percentage varies between models. When the full capacity is not needed to maintain the desired temperature, using the first stage is more efficient and provides better comfort. There are various control strategies for deciding whether to use first stage or second stage. A common strategy is to use first stage for a set amount of time (10 to 12 minutes) and then go to second stage for the remainder of the heating or cooling call. More sophisticated strategies require more inputs. Modulating equipment can adjust capacity to effectively any level between a minimum capacity and a maximum capacity.

Many ventilation systems utilize the air handler to circulate fresh air from outdoors throughout the residence. In these systems, the fresh air enters the system via the return ductwork at 36. Ventilation will be discussed in more detail later.

FIG. 2 shows the supply side of a typical un-zoned forced air HVAC system. The air handler 20 takes in air from return ductwork (not shown in FIG. 2), and then blows heated or cooled air into a plenum 38. From the plenum 38, the air flows through one or more trunk ducts 40. Branch ducts 42 conduct the air from the trunk ducts to registers in individual rooms. Air from the rooms then flows back to the air handler through the return ductwork.

A thermostat 44 measures the temperature of the air and compares it to a heating setpoint, a cooling setpoint, or both. In heating mode, when the air is cooler than the heating setpoint, the thermostat sends a heat call to the air handler, causing the air handler to run in heating mode to warm up the interior air. Once the air at the thermostat is warmer than the heating setpoint, the heating call ends and the air handler shuts off. To avoid cycling on and off too frequently, the thermostat doesn't call for heat until the air is a little less than the setpoint and doesn't end the heat call until the air temperature exceeds the setpoint by some margin. Cooling mode works similarly. The thermostat calls for cooling when the air temperature is a little above the cooling setpoint and ends the cooling call when the air temperature has decreased below the cooling setpoint by some margin.

Designers of the duct system try to set up airflow rates to each room based on average heat loss (or gain) rates. Upstairs rooms tend to have high cooling loads relative to their heating loads. If the designer sets the airflow to these rooms based on heating loads, they end up being under-cooled during summer. If, on the other hand, the designer sets the airflow to these rooms based on cooling loads, then they tend to be over-heated during winter. The designer may end up picking a middle level with the result that the upstairs rooms end up a little too warm all year. Basements, on the other hand, tend to have very low cooling loads relative to their heating loads.

Sometimes, a few rooms may temporarily have unusually high internal heat gains, for example from sunshine coming in particular windows, people gathering in particular rooms, cooking, running a fireplace, etc. Designers of un-zoned ductwork cannot do anything about these temporary differences between rooms. To the extent possible, the thermostat is located in a place that is usually representative of the temperature in occupied rooms. The system makes the space around the thermostat comfortable but other spaces may be uncomfortably warm or cold.

FIG. 3 shows a zoned ducted HVAC system. In this system, the upstairs rooms and downstairs rooms are served by separate trunk ducts 40A and 40B. However, both truck ducts are served by a single air handler 20. Zone dampers 46A and 46B open and close to either allow air to flow into a respective truck duct or block air from flowing into the trunk duct. The upstairs zone and the downstairs zone have separate thermostats 44A and 44B. A zone controller 48 takes in commands from the thermostats and sends commands to the air handler and to the zone dampers.

If the downstairs thermostat is calling for heat but the upstairs thermostat is not, the zone controller opens the damper 46A for the downstairs, closes the zone damper 46B for the upstairs, and commands the air handler 20 to produce heat. If both zones call for heat, the zone controller opens both zone dampers. If the zones have conflicting calls, the zone controller must choose which call to serve. Most commonly, this happens when one zone calls for heating or cooling while the other zone calls for fan only. In that case, the zone controller would likely give the heating or cooling call preference and ignore the fan command until the heating or cooling call is satisfied. It is rare to have one zone call for heating while another zone calls for cooling, but it can happen. In that case, the zone controller must alternate or give one type of call preference.

Two zone and three zone residential systems are common. However, it is problematic if any zone is too small relative to the size of the whole system. The air handler must be sized to serve the design heating and cooling loads of the whole building. When only a small zone is calling for heating or cooling, the air handler may produce more airflow than the single zone can handle. Pushing too much air through a single trunk duct and a few branch ducts may result in excessive pressure which can be harmful to the fan motor. It may also be noisy. This problem is exacerbated if the residents shut off the airflow to some of the registers, either intentionally or by blocking them with furniture or something else.

In addition to avoiding small zones, there are a few things a system designer can do to mitigate the small zone issue. Some systems have a bypass duct between the plenum and the return duct with a damper that automatically opens if the pressure exceeds a threshold. Opening this damper reduces the amount of air going through the remainder of the ductwork. However, the air flowing into the air handler is warmer in winter and cooler in summer which can be problematic. In summer, the cooler air entering the air handler increases the likelihood of frost on the heat exchanger coils, making the heat exchanger much less efficient, and possibly causing equipment damage.

A better remedy is to adjust the closed position of some of the dampers such that some air flows into those zones even when they are not calling for heating or cooling. Instead of directing air exclusively to the zones that are calling for heating or cooling, the system merely sends more airflow to the calling zones than to the non-calling zones. This works as long as the heating or cooling loads do not differ by too much and as long as the residents don't close off registers.

Residents often do modify the duct system. They may have rooms that they use infrequently, and they want to keep those rooms less conditioned to reduce heating and cooling bills. Sometimes, a room may tend to run warm or run cold relative to other rooms. As shown in FIG. 3, there are controllable registers 50 for the dining room on the first floor and for one of the bedrooms on the second floor. These may be electronically controlled. When these are closed, the respective zone effectively gets even smaller. It may end up smaller than the duct system designer planned for. Another possible modification is a duct fan 52 to increase airflow to under-served rooms, such as a room that is far from the air handler, as shown for bedroom 2 in FIG. 3.

The control logic for scheduling heating, cooling, and fan only operation of the air handler are distributed among the thermostats, an air handler control board, and the zone controller. The air handler control board and the zone controller are conventionally implemented as standardized hardware products that get installed and configured by an HVAC contractor. Because they are implemented as standardized hardware products, there are relatively few opportunities to customize the controls to the unique characteristics of the building. At most, the hardware may have a few switches that an installer can set to configure the product.

The control algorithms are also limited by the information available to them. The control algorithms rely predominantly on the information that is received from thermostats, which is usually no more than three binary inputs: heat call, cooling call, and fan call. Some thermostats are capable of providing a couple additional inputs, such as second stage calls or dehumidify mode calls. Some zone controllers are configured to utilize these additional pieces of information while many are not. The zone controller may also accept a couple additional sensor inputs, such as an outdoor temperature sensor or a plenum temperature or pressure. Any inputs that are not anticipated by the designer of the controller are not available to the control algorithms.

Indoor air tends to get polluted over time due to activities inside the house. Breathing reduces the concentration of oxygen and increases the concentration of carbon dioxide. Activities like cooking tend to produce Volative Organic Compounds (VOCs) some of which are unhealthy. Some items within a home may off-gas hazardous VOCs. Therefore, it is necessary to regularly exchange stale indoor air for fresh outdoor air. However, excess air exchange increases the heating and cooling loads and costs. Older homes typically are not very airtight, so these homes often experience excessive air exchange, leading to higher heating and cooling cost. To combat these costs, builders have learned how to build houses that have low air leakage. In newer homes or homes that have been upgraded to be more airtight, it is necessary to use mechanical systems to intentionally bring in an appropriate amount of fresh outdoor air.

There are several types of mechanical ventilation systems. An exhaust only system uses a fan, such as a bathroom fan, to blow air out of the house. That depressurizes the inside of the house causing air to come in wherever there are leakage paths. Supply ventilation, on the other hand, uses a fan, such as the air handler blower, to blow outdoor air into the house, pressurizing the house and causing air to leave through leakage paths. Balanced systems blow approximately equal amounts of air into the house and out of the house. With a Heat Recovery Ventilator (HRV), the incoming and outgoing air streams go through a heat exchanger such that the incoming air in preconditioned to be near the same temperature as the interior air. The preconditioning improves occupant comfort and reduces heating and cooling energy use. Enthalpy Recovery Ventilators (ERVs) exchange both heat and moisture between the air streams.

With supply ventilation and balanced ventilation, the incoming fresh air should be distributed around the house. (Exhaust ventilation doesn't provide an opportunity to control how fresh air is distributed.) Some systems use separate ventilation ductwork to distribute the fresh air. In other systems, the fresh air is injected into the return ductwork, as shown in FIG. 1, and the air handler distributes the fresh air through the supply ductwork. This is referred to as an interconnected ventilation system. Interconnected ventilation systems are cheaper to install than systems with separate ductwork. However, the operating costs are higher because, to distribute the fresh air, the blower must run more than it otherwise would.

The fraction of time that a ventilation system needs to run depends on what is happening in the house. When there are many guests in the house, such as for a holiday meal, a lot of ventilation is needed. When only a couple people are in the house, a moderate amount of ventilation is needed. If the residents decide the outdoor temperature is comfortable enough to open windows, no mechanical ventilation at all is needed. However, conventional ventilation controls don't have access to information about what is happening in the house, so typically an average amount is selected.

In recent years, home automation systems have become popular. One common type of home automation system utilizes a home automation hub which communicates with a wide variety of low-cost sensors and actuators that can be installed by homeowners. Types of sensors include contact sensors which sense when doors and windows are open, temperature sensors, humidity sensors, motion sensors, etc. Actuators include switches, light bulbs, speakers, automated blinds, etc. New types of sensors and actuators are constantly being developed. Hubs are designed such that these new types of sensors and actuators may be added without purchasing a new hub. The homeowner may define automations using rules or other software mechanism to cause the actuators to act in response to events detected by the sensors. The hub provides tremendous flexibility for the homeowner to specify the logic for these automations. The sensors and actuators communicate with the hub through a variety of radio communication protocols. Additionally, the hub is typically connected to the internet via a router and can exchange information with additional sensors and actuators via the internet.

SUMMARY

A zoning interface module includes a wired air handler interface, a wired thermostat interface, a home automation interface, and a processor. The wired air handler interface is configured to send output signals to an air handler. The wired air handler interface may be further configured to receive power from the air handler. The wired thermostat interface is configured to receive input signals from at least one thermostat. The wired thermostat interface may be further configured to send power to the at least one thermostat. The home automation interface, which may be wireless, is configured to communicate with a home automation hub. The processor is programmed to attempt to establish and maintain communication with the home automation hub and to take further actions dependent upon whether communication is successfully maintained. In response to successfully establishing communication with the home automation hub, the processor is programmed to receive the output signals from the home automation hub and forward the output signals to the air handler via the wired output interface. In response to failure to maintain communication with the home automation hub, the processor is programmed to determine the output signals based on the input signals using a default control strategy and to forward the output signals to the air handler via the wired output interface. A wired zone damper interface may be configured to selectively send power to a plurality of zone dampers. The processor may be further programmed to activate selected zones using the wired zone damper interface. In response to successfully establishing communication with the home automation hub, the processor may receive zone selections from the home automation hub. In response to failure to establish communication with the home automation hub, the processor may determine zone selections using the default control strategy or may activate all available zones. The processor may be further programmed to, while communication is established with the home automation hub, receive configuration parameters for the default control strategy from the home automation hub and store the parameters for later use when communication with the home automation hub is not available. The processor may be further programmed to forward the input signals to the home automation hub.

A method of controlling an HVAC system includes receiving input signals, attempting to communicate with a home automation hub, and then sending output signals to an air handler dependent upon whether communication with the home automation hub is successfully established and maintained or not. The input and output signals comprise a series of calls for heating, cooling, or fan, each call having a begin time and an end time. The input signals are received from at least one thermostat via a wired input interface. In response to successfully establishing communication with the home automation hub, a first set of output signals are received from the home automation hub and forwarded to the air handler via a wired output interface. In response to failure to maintain communication with the home automation hub, a second set output signals is determined based on the input signals using a default control strategy and forwarded to the air handler via the wired output interface. In response to successfully establishing communication with the home automation hub, zone selections may be received from the home automation hub and selected zones may be activated using the wired output interface. In response to failure to maintain communication with the home automation hub, all available zones may be activated or the default control strategy may determine zone selections. While communication is established with the home automation hub, configuration parameters for the default control strategy may be received from the home automation hub and stored for later use when communication with the home automation hub is not available.

A zoning interface module includes a wired air handler interface, a wireless home automation interface, and a processor. The wired air handler interface is configured to send output signals to an air handler. The wired air handler interface may be further configured to receive power from the air handler. The wireless home automation interface is configured to communicate with a home automation hub. The processor is programmed to attempt to establish and maintain communication with the home automation hub and take further actions dependent upon whether communication is successful. In response to successfully establishing communication with the home automation hub, the processor is programmed to receive the output signals from the home automation hub and to forward the output signals to the air handler via the wired output interface. In response to failure to maintain communication with the home automation hub, the processor is programmed to determine the output signals using a default control strategy and to forward the output signals to the air handler via the wired output interface. In one embodiment, determining the output signals using the default control strategy comprises receiving signals from a thermostat via a wired thermostat interface. In another embodiment, the zoning interface module takes the form of a specially adapted thermostat. In this embodiment, determining the output signals using the default control strategy comprises measuring a temperature and comparing the temperature to a setpoint. The setpoint may be received from a user interface.

DETAILED DESCRIPTION

Figure 3:
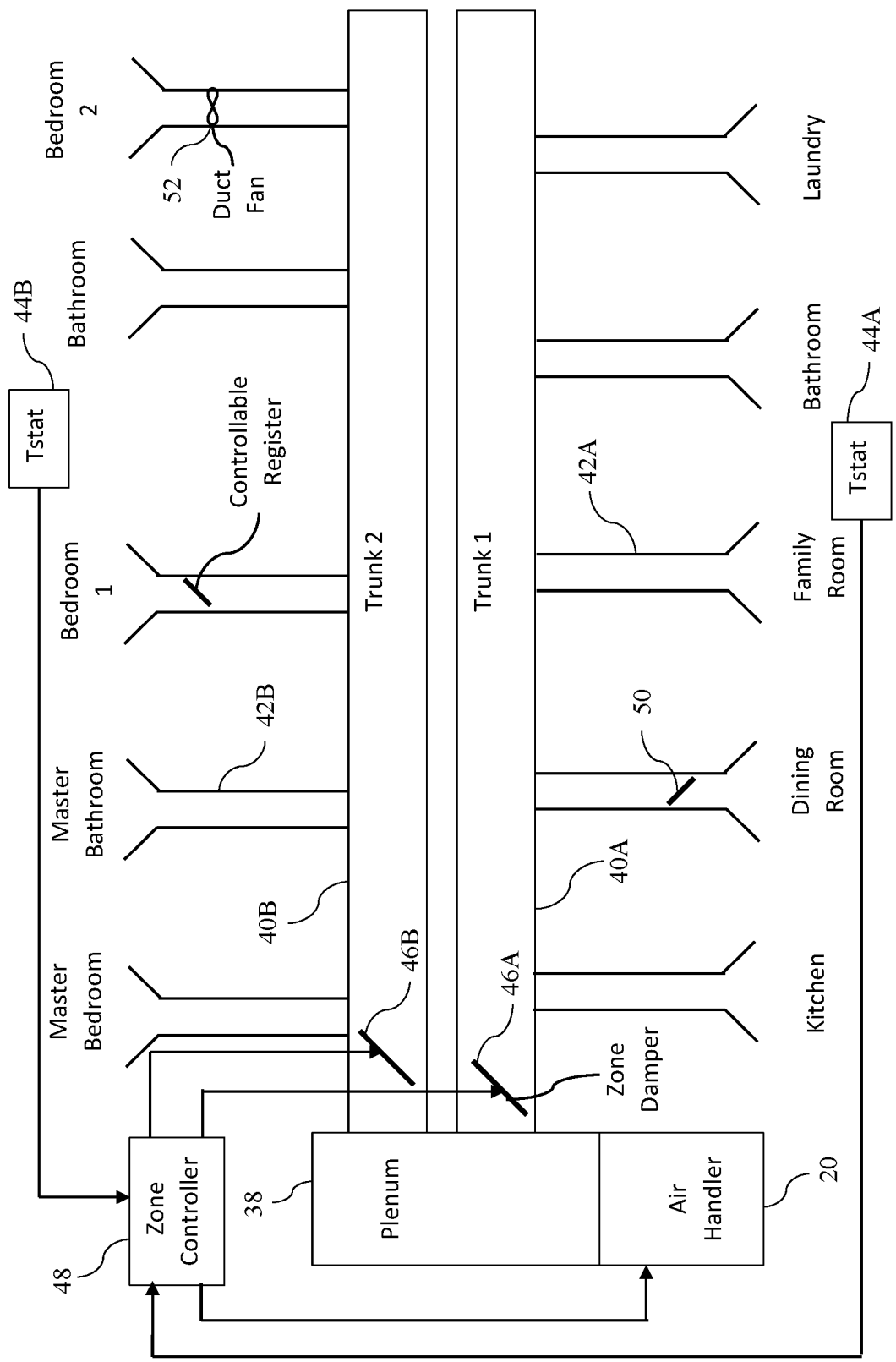
FIG. 3 is a schematic diagram of a prior art zoned supply duct system.
Figure 4:
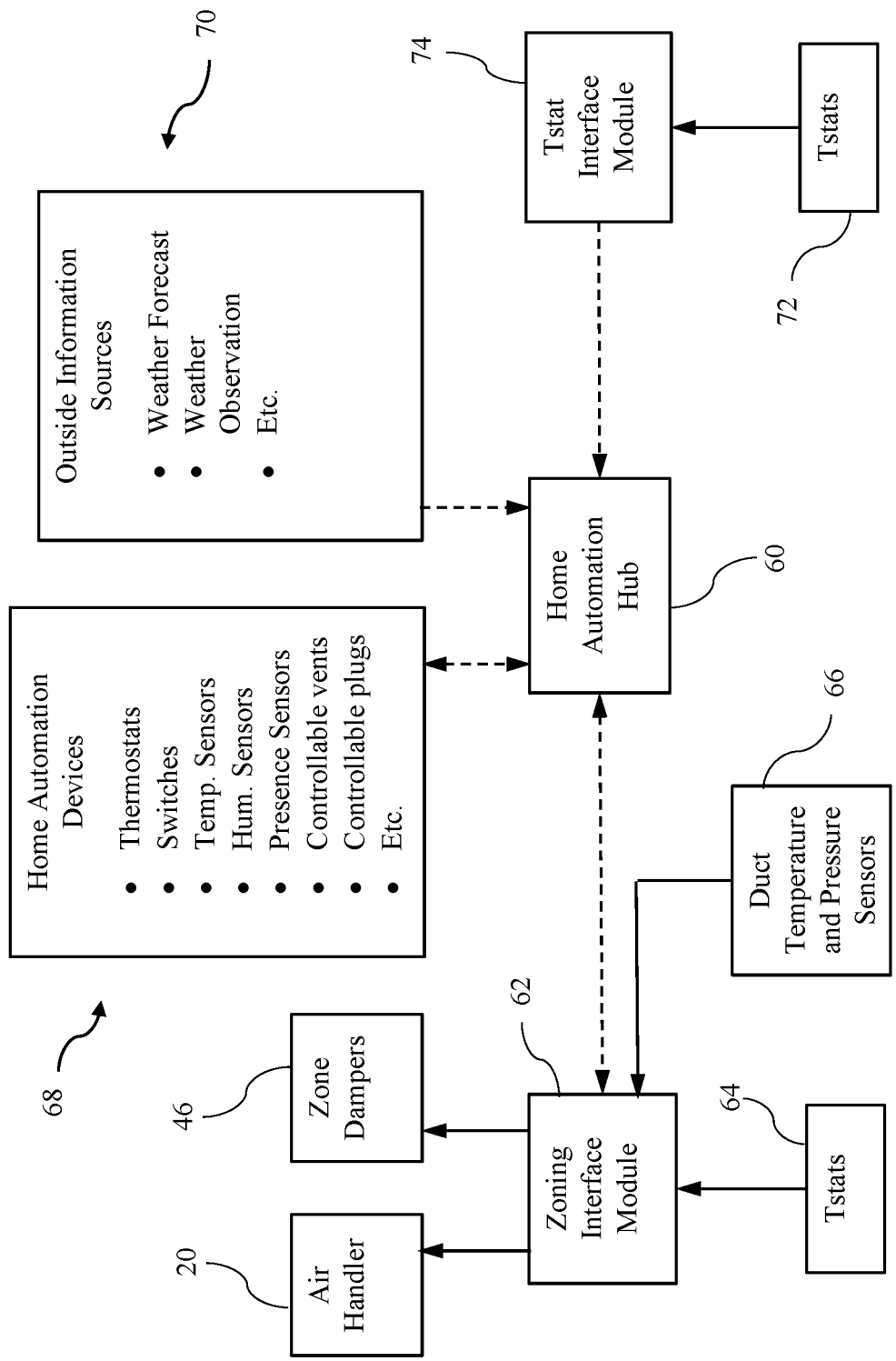
FIG. 4 is a schematic diagram for a zoned HVAC control system utilizing a home automation hub and a zoning interface module.

FIG. 4 illustrates a zoned forced air HVAC control system that utilizes a home automation hub 60. This enables improved performance of the HVAC system because control algorithms that utilize information available to the home automation hub can be utilized by the HVAC control algorithms. Solid arrows indicate flow of information through wired connections. Dotted arrows indicate flow of information via either radio communication or a wired interface. The radio communication may utilize Wifi, Zwave, Zigbee, Bluetooth, or other wireless communication protocols. A zoning interface module 62 receives control signals from at least one thermostat 64 and sends control signals to the air handler 20 and to the zone dampers 46. The zoning interface module takes the place of the zone controller of FIG. 3.

Figure 1:
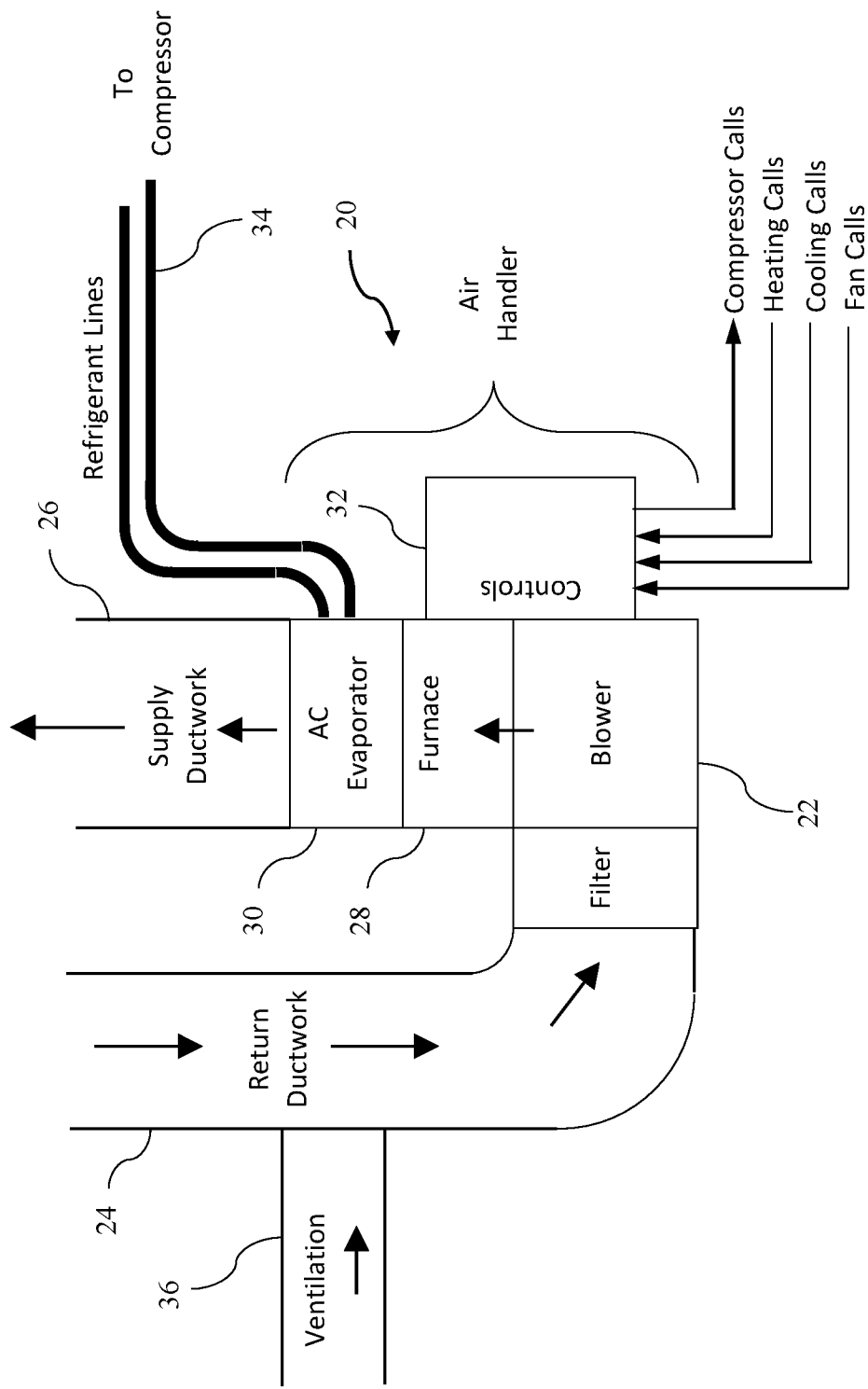
FIG. 1 is a schematic diagram of a prior art air handler for a forced air HVAC system.
Figure 2:
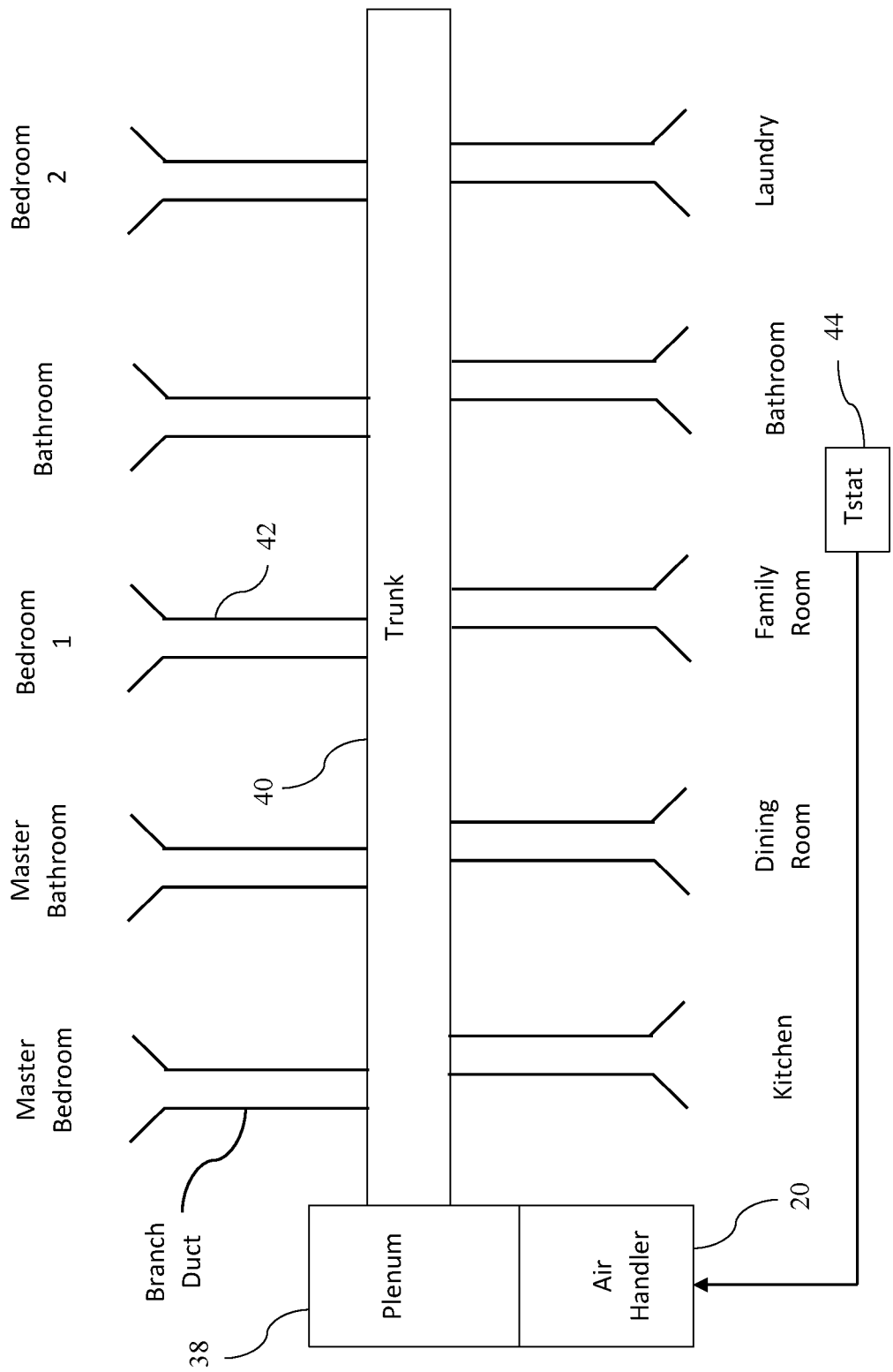
FIG. 2 is a schematic diagram of a prior art unzoned supply duct system.

The zoning and equipment control logic run predominantly on the home automation hub 60. The hub may receive heating, cooling, and fan calls from the at least one thermostat 64 connected to the zoning interface module 62. The hub sends commands to operate the equipment and to open and close zone dampers to the zoning interface module. The zoning interface module is programmed to control the equipment and dampers according to default logic whenever radio communication with the hub is not established. The default logic is designed to ensure reasonable operation in the event of a problem with the hub or with the radio communication link. The default logic may simply forward the commands from a single thermostat to the air handler and command all zones to a state specified during setup, such as all zones open. That would cause the system to operate as an un-zoned system as shown in FIG. 2. Alternatively, the zoning interface module may accept wired signals from multiple thermostats and may implement default logic comparable to the control logic of prior art zone controllers as shown in FIG. 3. The Zoning interface module may optionally also receive information from sensors 66 associated with the HVAC equipment such as temperature, humidity, and pressure at various positions in the ductwork. These sensor values may be used by the default logic and be made available to the home automation hub via the radio interface.

A zoning App runs on the hub 60 and implements algorithms to control the equipment and zone dampers in response to signals from the one or more thermostats wired to the zoning interface module, signals from additional thermostats, and signals from other sensors in the home automation system. Source code for such as App is available at https://github.com/rbaldwi3/HVAC. The files in this repository are hereby incorporated by reference in their entirety. The other sensors include both sensors within the home 68 and information from outside the home 70 which is obtained via the internet. (Even some of the sensors inside the home may communicate with the hub via cloud-based services.) Some thermostats are designed to communicate with a home automation hub. Thermostats 72 which are not designed to communicate with a home automation hub may provide heat, cooling, and fan calls to the hub via a thermostat interface module 74.

Like a conventional zone controller, the App receives requests from each zone, decides which requests it can serve, then selects the zones to be served and commands the equipment accordingly. In a conventional zone controller, the requests are binary. A zone is either requesting heat or not requesting heat. With the App, the zone requests a specified airflow rate. The App ensures that no more than the requested airflow rate is delivered to that zone. To accomplish this, the App needs information about the airflow capacity of each zone and the airflow provided by the equipment. This information is entered during setup. Exact data is not needed to make the system function properly. Rules of thumb should typically be adequate. These settings can be changed later if necessary.

There are a number of opportunities for users to specify how the App should handle various situations. App settings are employed for user inputs that would be changed infrequently once the system is set up. For inputs that are likely to change on a frequent basis, the App uses devices, such as virtual switch devices, in the home automation system. The user indicates what device to use during setup and then manipulates the device as desired during use. Most often, virtual devices are preferred over physical devices for this purpose. The user may turn these switches off and on via a dashboard interface or may set up rules to set the switches based on conditions sensed by other devices. In this way, behavior of the HVAC system may react indirectly to inputs never envisioned by the App programmer.

Similarly, the App outputs are home automation system devices. During setup, the user specifies which devices (usually switches) the App should set for each output. The switches to control the air handler and the zone dampers will usually be implemented as child devices of the zoning interface module 62. Ventilation equipment and devices used to select subzones may or may not be designed to communicate with the hub. If not, they may be controlled, for example, by plugging them into a controllable plug. In some cases, the user may create a virtual switch which is manipulated by the App and link that switch to physical devices through rules.

For two-stage equipment, the App generally uses only first stage as often as possible because that is most efficient and provides the greatest comfort. The App commands second stage when necessary to keep up with especially high demand or to accomplish a significant change in temperature, such as when recovering from a setback. The App commands second stage if first stage has been operating continuously for a user selectable amount of time. If first stage is insufficient to satisfy the residence's heating or cooling load, second stage will eventually be commanded. Sometimes, second stage may be commanded even when first stage would have eventually satisfied the demand. Selecting a longer amount of time reduces the times that happens. The user can also set a temperature difference from setpoint to trigger second stage. The App selects second stage any time that any zone is further from its setpoint than specified. This typically happens because the setpoint was changed and this setting triggers second stage to help the system catch up to the new setpoint rapidly. Finally, the App may select second stage in response to a user specified virtual switch, which the user may have programmed based on other sensors in the home automation system. In this way, the App may command second stage based on inputs the App programmer didn't know would be available. The system will never select second stage unless the zones calling for heating or cooling have enough capacity for second stage.

The App is structured hierarchically. There is a main App which controls the equipment and child apps for each zone. Any subzones, such as controllable registers or duct booster fans are handled by another level of child apps under the corresponding zone app. Like other home automation apps, there is not necessarily a user interface. However, it is useful to set up a dashboard with all of the input and output devices.

The App may be configured to ensure that ventilation is on for a specified percentage of each hour. To make it convenient to adjust this percentage based on conditions in the house, the App reads the percentage from a dimmer device. Normal ventilation is suspended if the dimmer control is turned off. Rules can be used to adjust the ventilation percentage based on whatever information is available to the home automation system. For example, the home automation system may determine the number of people in the house using presence sensors and command more ventilation when more people are present. If an air quality sensor indicates a high degree of indoor pollution, the percentage may be increased. If the home automation system knows, based on contact sensors, that the windows are open, rules may temporarily turn normal ventilation off. These adjustments are intentionally not programmed into the App because the App cannot anticipate what relevant information will be available in a particular installation.

The user may optionally indicate a switch for forcing the ventilation to be on. This is useful if the ventilation system accomplishes bathroom ventilation, for example. The switch could be the same switch used to turn on a light in the shower so that ventilation always runs when someone is showering. Or, it could be a virtual switch set by rules.

The App also allows users to specify which zones should be selected when ventilation is running without heating or cooling equipment. This is useful for directing the fresh air to the zones that are occupied. For example, when a home automation mode is night, the system may direct fresh air to the zones with bedrooms. This capability does not guarantee that fresh air gets to those zones because heating and cooling calls take priority. However, on average, it increases the percentage of fresh air going to the desired rooms.

The strategy used by the App to control ventilation depends upon whether the ventilation system requires the blower to operate when ventilating or not. If the blower is not required, then ventilation control is not impacted by heating and cooling calls. For these systems, the App simply turns the ventilation on for the first portion of each hour.

If the blower is required, the App attempts to schedule ventilation at the same time as heating or cooling calls. In that way, the total runtime of the blower is reduced. For example, if the ventilation system should run 30% of the time and the heating system needs to run 30% of the time, it is best if these are the same 30%. If there is complete coordination, the blower only needs to run 30% of the time. Without coordination, the blower could run as much as 60% of the time.

Conventional HVAC equipment uses 24 volt, alternating current (24VAC) electrical connections for both power and for control signals. The air handler typically includes a transformer that produces 24VAC from the 110V or 240V AC line connections. This 24VAC is fed to the thermostats and other equipment via a power line (usually red wire and often labeled R, RC, or RH) and a common line (usually blue wire and labeled B or C). A thermostat indicates a heating call by connecting the power line to a heat call signal line (usually white wire and labeled W or W1). Similarly, a fan only call is indicated by connecting the power line to a fan signal line (usually green wire and labeled G). A cooling call is indicated by connecting the power line to the fan signal line and to a cooling call line (usually yellow wire and labeled Y, Y1, or Y/Y2). In an un-zoned system, these thermostat signals are provided directly to the air handler as illustrated in FIG. 2. In a zoned system, the thermostat signals are provided to a zone controller which then provides signals, using the same conventions, to the air handler as shown in FIG. 3. (For heat pumps, a slightly different convention is used.)

Zone dampers are typically spring loaded to either open or closed. They have two electrical terminals and are controlled by providing 24VAC between the terminals to move the damper to the non-spring-loaded position. A zone damper that is spring-loaded to the open position is called a normally-open damper, whereas a damper that is spring-loaded to the closed position is called a normally-closed damper.

Figure 5:
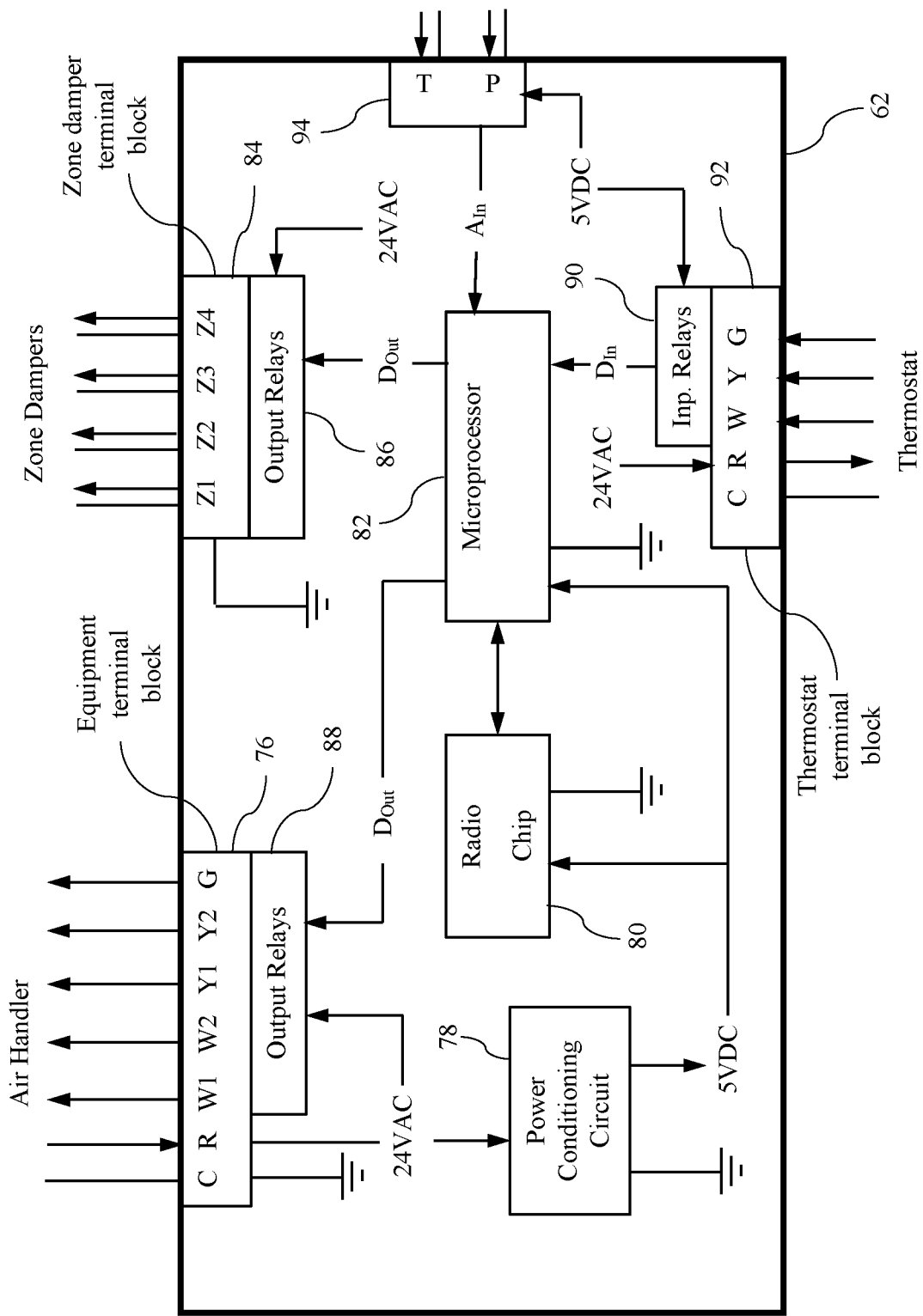
FIG. 5 is a schematic diagram of the zoning interface module of FIG. 4.

FIG. 5 illustrates the internal structure of the zoning interface module 62. The zoning interface module facilitates communication between the hub and devices and equipment that utilizes the 24VAC conventions.

The interface module includes an equipment terminal block 76 for connecting to the air handler 20. In the illustrated embodiment, the equipment terminal block 76 includes seven wire terminals. Two of the wire terminals are for the common (ground) and 24VAC power input, respectively, from the air handler transformer. The other five are labeled for a furnace and air conditioning system with two stages of heating and two stages of cooling. The labels would be different for other types of systems, such as a heat pump system. If the system does not have two stages of heating and two stages of cooling, some of the output terminals can be used to control other functions, such as activating a dehumidification mode, or other equipment, such as ventilation equipment, that operates based on the 24VAC conventions.

A power conditioning circuit 78 transforms the 24VAC into whatever voltage is required by other circuits within the zoning interface module, such 5 volts direct current (5VDC). A radio chip 80 implements at least one of the radio standards accessible by the home automaton hub 60, such as Zigbee, Zwave, Bluetooth, or Wifi. Alternatively, the zoning interface module may be configured to communicate with the hub via a wired interface, such as ethernet. A microprocessor 82 may be provided to implement the default control strategy whenever communication with a home automation hub running the zoning App is not available. Configuration information for the default strategy can be entered while communication with a hub or a special purpose configuration device is available. The configuration information is then stored in the microprocessor's non-volatile memory. The configuration information may include information about the attached equipment. For example, if a heat pump is attached, then the default strategy may convert heating and cooling calls into compressor calls and reversing valve position calls.

A zone damper terminal block 84 includes a set of pairs of terminals. One terminal in each pair is connected to common. The other terminal in each pair is selectively connected to 24VAC to indicate that the zone damper should move from its default position.

The selective connections to 24VAC in both the zone damper terminal block and the equipment terminal block are accomplished via output relays 86 and 88 respectively. The microprocessor sends a 5VDC digital output when the terminal should be connected to 24VAC. This causes current to flow through the driving circuit of an output relay to common. Current through the driving circuit connects the terminal to 24VDC. In the example embodiment of FIG. 5, the zone damper terminal block has eight terminals to control up to four zone dampers. If the system has fewer than four zone dampers, the selectively powered terminal of unused pairs can be used to control other functionality or other equipment. If the system has more the four zone dampers, then any unused outputs in the equipment terminal block may be used. If no terminals are available, additional relays in communication with the hub must be added to the system. However, relays that are not part of the zoning interface module will not be manipulated as part of the default control strategy.

The term relay refers to any device that opens or closes a driven circuit in response to current in a driving circuit. This includes, for example, mechanical relays, solid state relays, and circuits using opto-couplers. For output relays, the driving circuit is 5VDC and the driven circuit is 24VAC in the illustrated examples. For input relays, such as 90, the driving circuit is 24VAC and the driven circuit is 5VDC in the illustrated examples.

The zoning interface module 62 includes at least one thermostat terminal block 92. Each thermostat terminal block includes at least five terminals. Two of the terminals are used to provide 24VAC power to the thermostat. The other three terminals are for receiving heating calls, cooling calls, and fan calls. Additional terminals may be included in the thermostat terminal blocks to accommodate thermostats that provide additional signals, such as second stage calls. The thermostat connected to the thermostat terminal block is not necessarily capable of radio communication with the hub. However, additional functionality may be available in the zoning App if the thermostat does also provide information to the hub via a radio protocol, either directly or via a cloud service.

Optional analog input terminals 94 are shown at the right of FIG. 5. In the illustrated embodiment, each sensor is provided with 5VDC power and returns its value by setting the voltage of the signal wire to a value between 0VDC and 5VDC depending on the sensed quantity. The analog signals are provided to the microprocessor for use in the default strategy and so that the microprocessor can forward them periodically to the home automation hub via the radio chip to make the values available to the App. In an alternative embodiment, the zoning interface module may include one or more pressure transducers which sense air pressure directly and output an analog signal in response. In such an embodiment, the pressure terminal would be replaced by an air hose connection.

The thermostat interface module 74 is structured similarly to the zoning interface module, except that it does not have a zone damper terminal block and has a two-terminal power supply terminal block instead of the air handler terminal block. The number of thermostat interface modules that are required depends on the number of thermostats that are not capable of radio communication with the hub. Installations where most of the thermostats are capable of radio communication with the hub will not need any thermostat interface modules. Offering such a module as a separate component allows the manufacturer to limit the number of thermostat terminal blocks on the zoning interface module while still being able to support systems with no predetermined limit on the number of non-radio thermostats.

Figure 6:
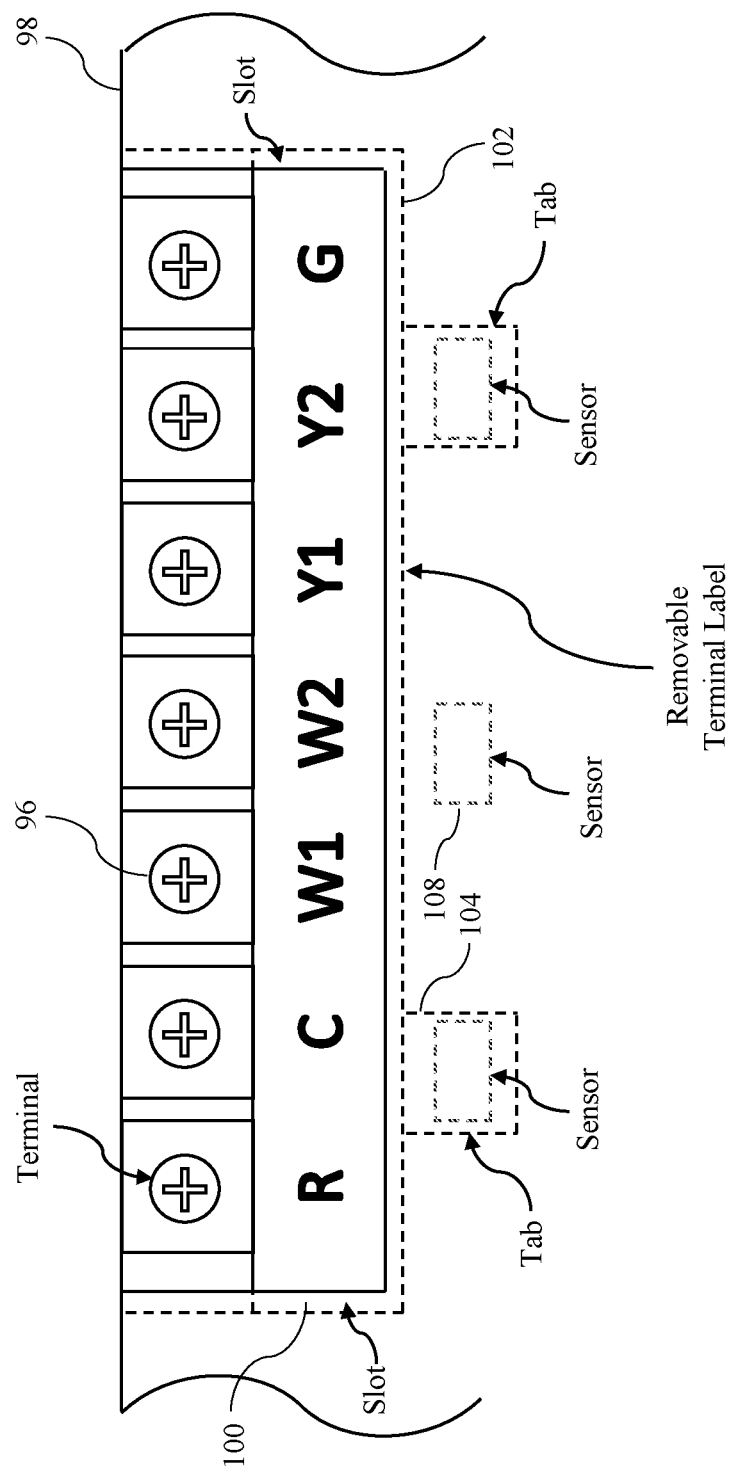
FIG. 6 is a front view of an equipment terminal block of the zoning interface module of FIG. 5 with a removeable terminal label.

FIG. 6 is a detailed view of the equipment terminal block 76 of the zoning interface module. In the example embodiment, seven screw terminals 96 are provided. In alternative embodiments, different types of terminals, such as spring-loaded clips or lever terminals, may be provided. The housing 98 of the zoning interface module 62 has a slot 100 to insert a removable terminal label 102. The front side of the removable terminal label has letters adjacent to each of the terminals to indicate the function of the terminal (and the color of wire if standard conventions are followed). A set of removable terminal labels may be provided with each removable terminal label corresponding to particular equipment types.

Figure 7:
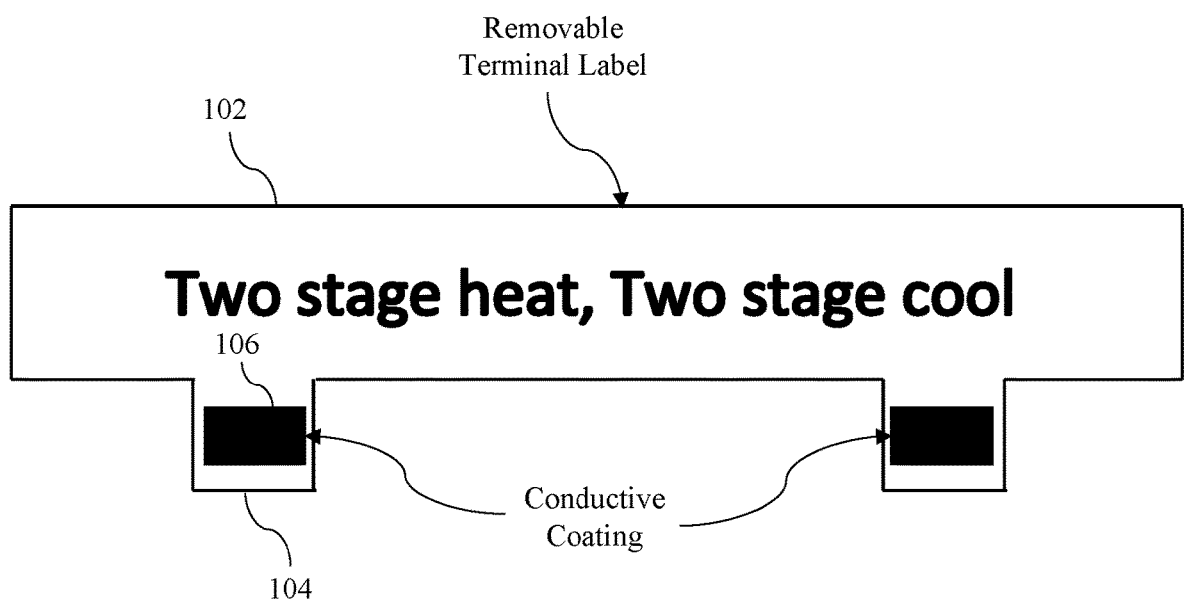
FIG. 7 is a rear view of the removeable terminal label of FIG. 6.
Figure 8:
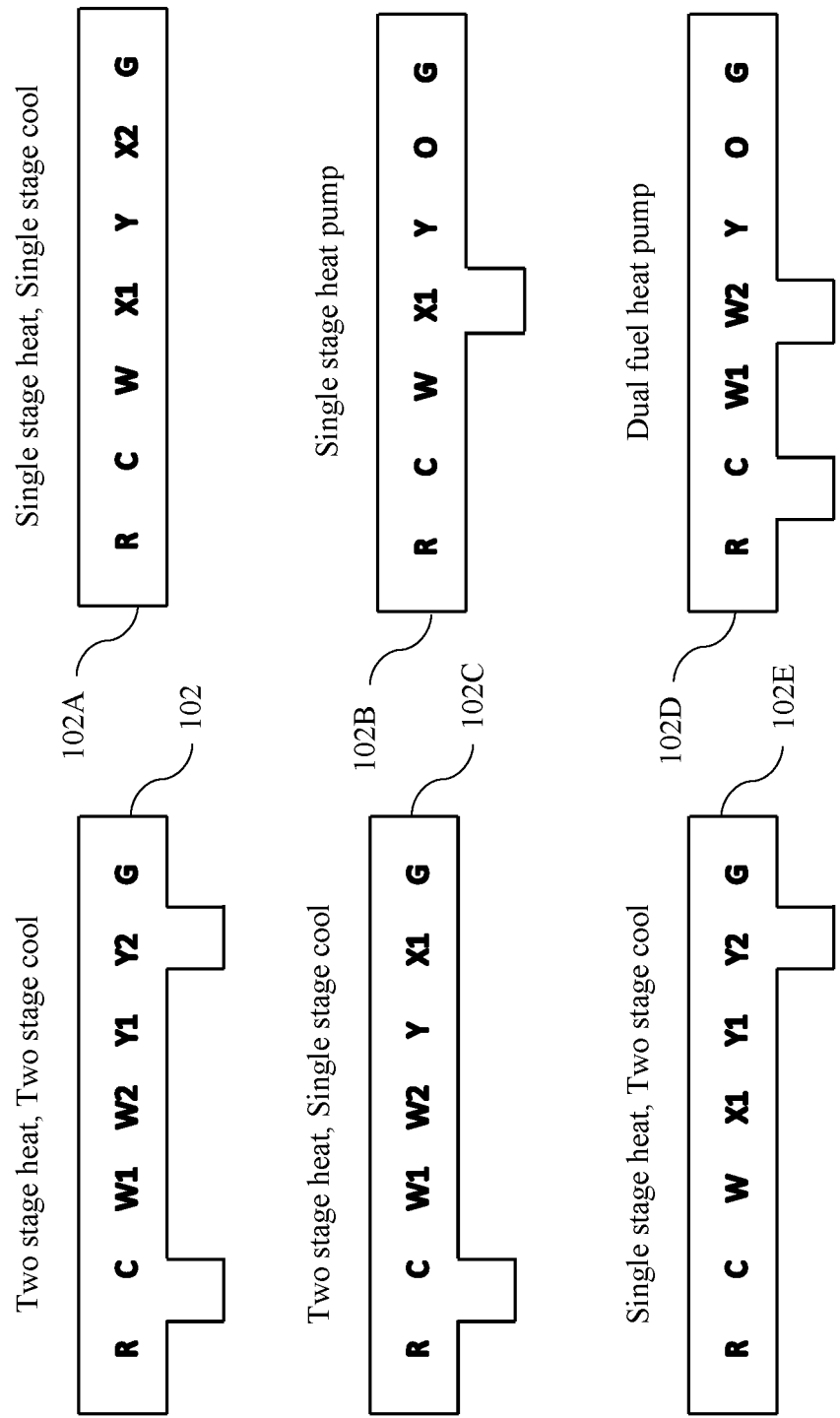
FIG. 8 is a collection of front views of other removeable terminal labels suitable for use with the zoning interface module of FIG. 5.

Each removable terminal label may include features which interact with sensors of the zoning interface module. This provides information to the zoning interface module about what type of equipment is installed. This information may be utilized directly by the default logic executed directly by the zoning interface module and may also be provided to the App running on the home automation hub. FIG. 7 shows the back side of the removable terminal label 102 of FIG. 6. Two tabs 104 extend from the label and have a conductive coating 106. When installed, this coating completes an electrical circuit in a sensor 108. Alternatively, the tabs could be mechanically sensed by the sensors 108. FIG. 8 shows some of the other potential removable terminal labels for various types of equipment. Each one has a different set of tabs with conductive coatings. Alternatively, they could all have the same set of tabs but have conductive coatings in different positions. Note that terminals that are not needed for equipment control are labeled X1, X2, etc. Although illustrated here for a zoning interface module, a similar system could be employed for other components of a heating system, such as a thermostat, that is designed to work with a variety of types of equipment and which requires slightly different equipment connections for different types of equipment.

Figure 9:
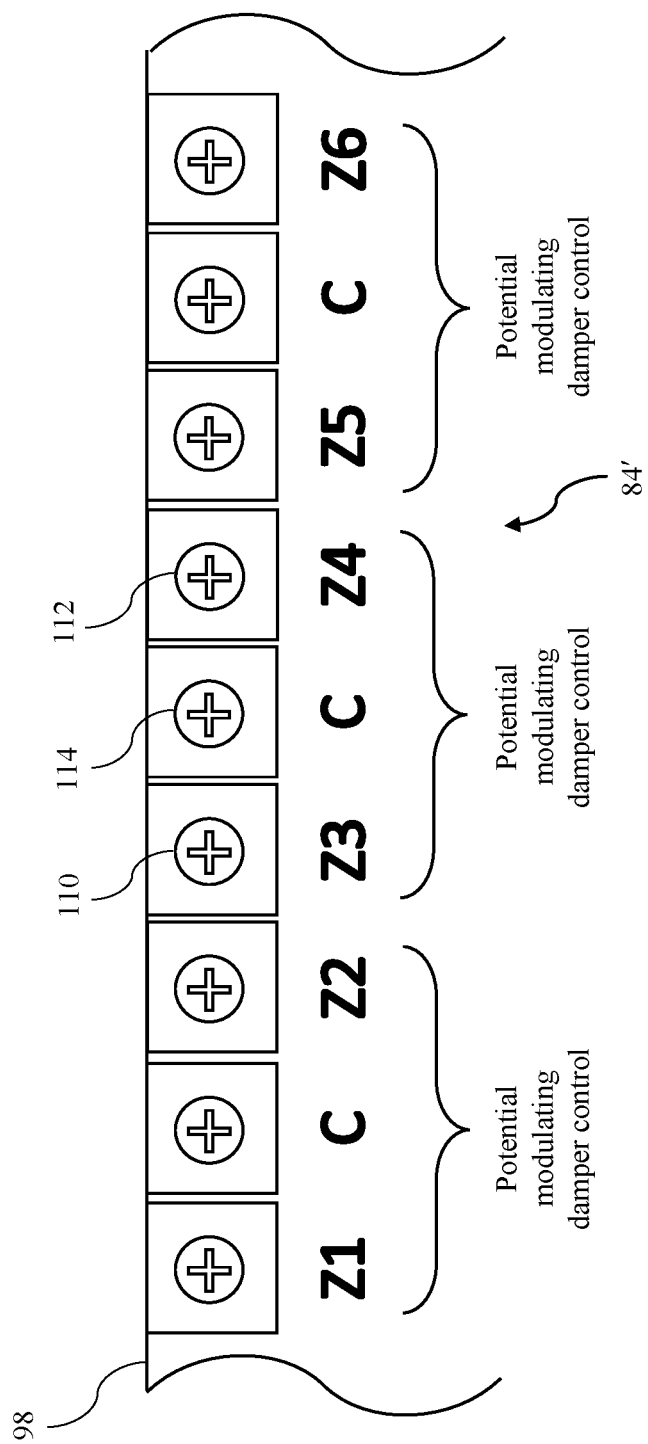
FIG. 9 is a front view of a zone damper terminal block of the zoning interface module of FIG. 5.

FIG. 9 shows an alternative embodiment of the zone damper terminal block 84'. In this embodiment, the terminals are arranged in groups of three terminals. These are used for modulating dampers that do not have a spring that forces the damper to a predefined position. One of the three terminals 110 is selectively connected to 24VAC to indicate that the damper should move toward an open position. Another the of three terminals 112 is selectively connected to 24VAC to indicate that the damper should move toward the closed position. The final terminal 114 is connected to common. The type of damper is indicated during a configuration step. If a group of three terminals is configured as a modulating damper, the device driver will create a dimmer child device with which to indicate the position of the damper. If a group is configured for spring loaded normally open or normally closed dampers, then two switch child devices are created. The common wires for the two zone dampers share the common terminal.

The zoning interface module 62 determines whether the App is managing the equipment and the zone dampers or the default strategy should be executed. For example, the App may send a presence signal periodically, such as every 15 minutes, to indicate that it is operating. The presence signal may be a separate signal from the equipment commands and zone activation commands, or equipment commands and/or zone selection commands may serve as the presence signal. The zoning interface module switches to the default strategy whenever it has not received a presence signal for a predetermined amount of time, such as 20 minutes. Another possibility is that the zoning interface module would execute the default strategy whenever a heating or cooling call is received via a thermostat terminal block and no corresponding heating or cooling command is received from the App within a predetermined amount of time, such as one minute.

Figure 10:
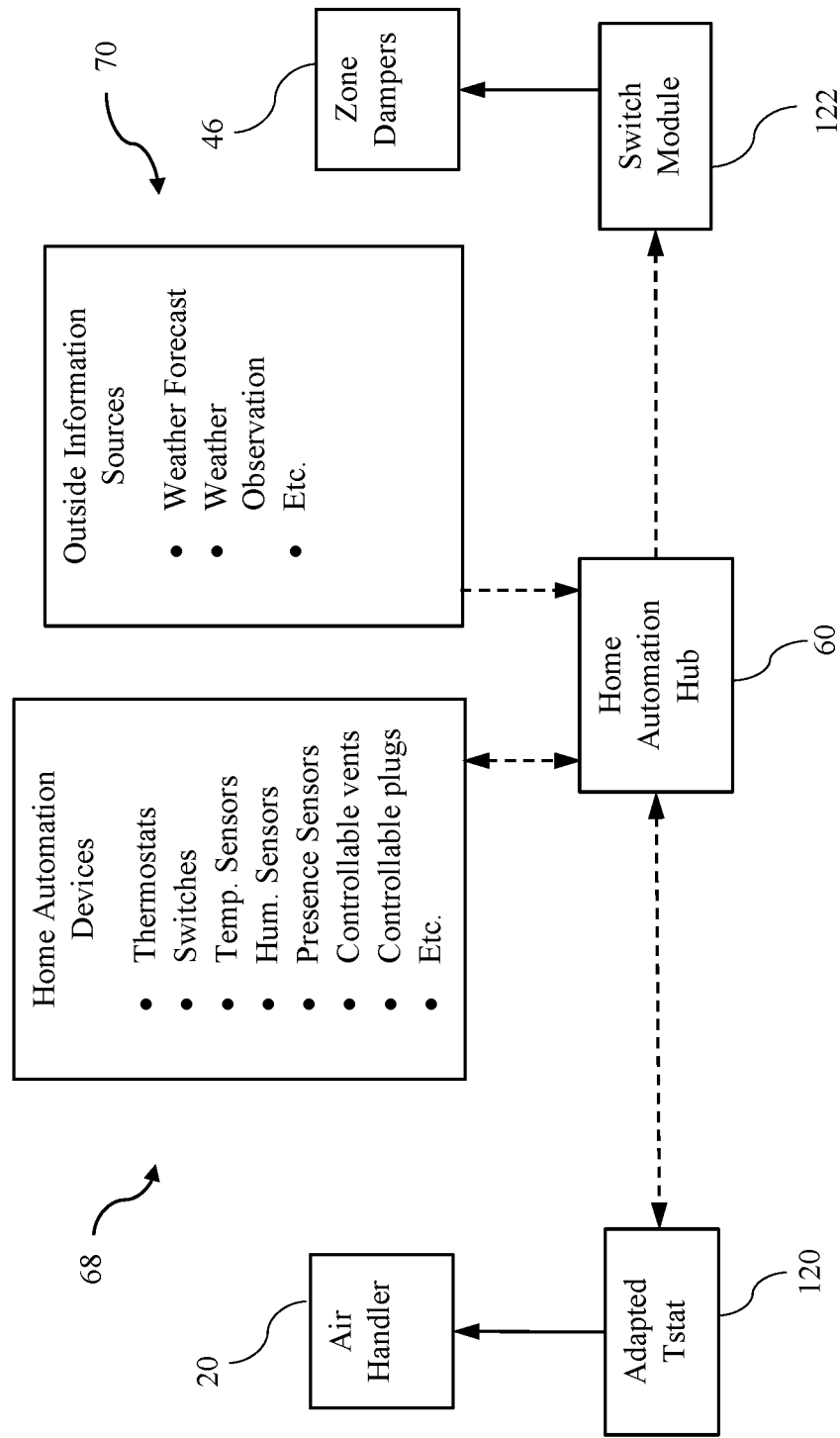
FIG. 10 is a schematic diagram for a zoned HVAC control system utilizing a home automation hub and a specially adapted thermostat.

FIG. 10 illustrates an alternative embodiment of a zoned forced air HVAC control system that utilizes a home automation hub 60. This embodiment shares many of the features and advantages of the embodiment of FIG. 4. For example, performance of the HVAC system is improved because control algorithms my utilize information available to the home automation hub. Solid arrows indicate flow of information through wired connections. Dotted arrows indicate flow of information via either radio communication or a wired interface. A specially adapted thermostat 120 combines the features of a thermostat with some of the features of the zoning interface module. This embodiment offers advantages for retrofit situations because the specially adapted thermostat can directly replace an existing conventional thermostat. The adapted thermostat 120 takes the place of the zone controller of FIG. 3.

Like the embodiment of FIG. 4, the primary zoning and equipment control logic runs on the home automation hub 60. When communication with a hub is available, the adapted thermostat sends heating, cooling, and fan calls to the hub, but sends commands to the equipment only at the request of the hub. The hub may receive heating, cooling, and fan calls from the adapted thermostat 120 and from other thermostats. The hub sends commands to operate the equipment to the adapted thermostat 120, which forwards them to the equipment. If the system includes zone dampers, commands to open and close the dampers are sent to a switch module 122. Commands to change the state of controllable vents may be sent directly to the vents by radio communication. The adapted thermostat 120 is programmed to control the equipment according to default logic whenever radio communication with the hub is not established. The default logic, which is essentially the same as conventional thermostat operation, ensures reasonable operation in the event of a problem with the hub or with the radio communication link.

Figure 11:
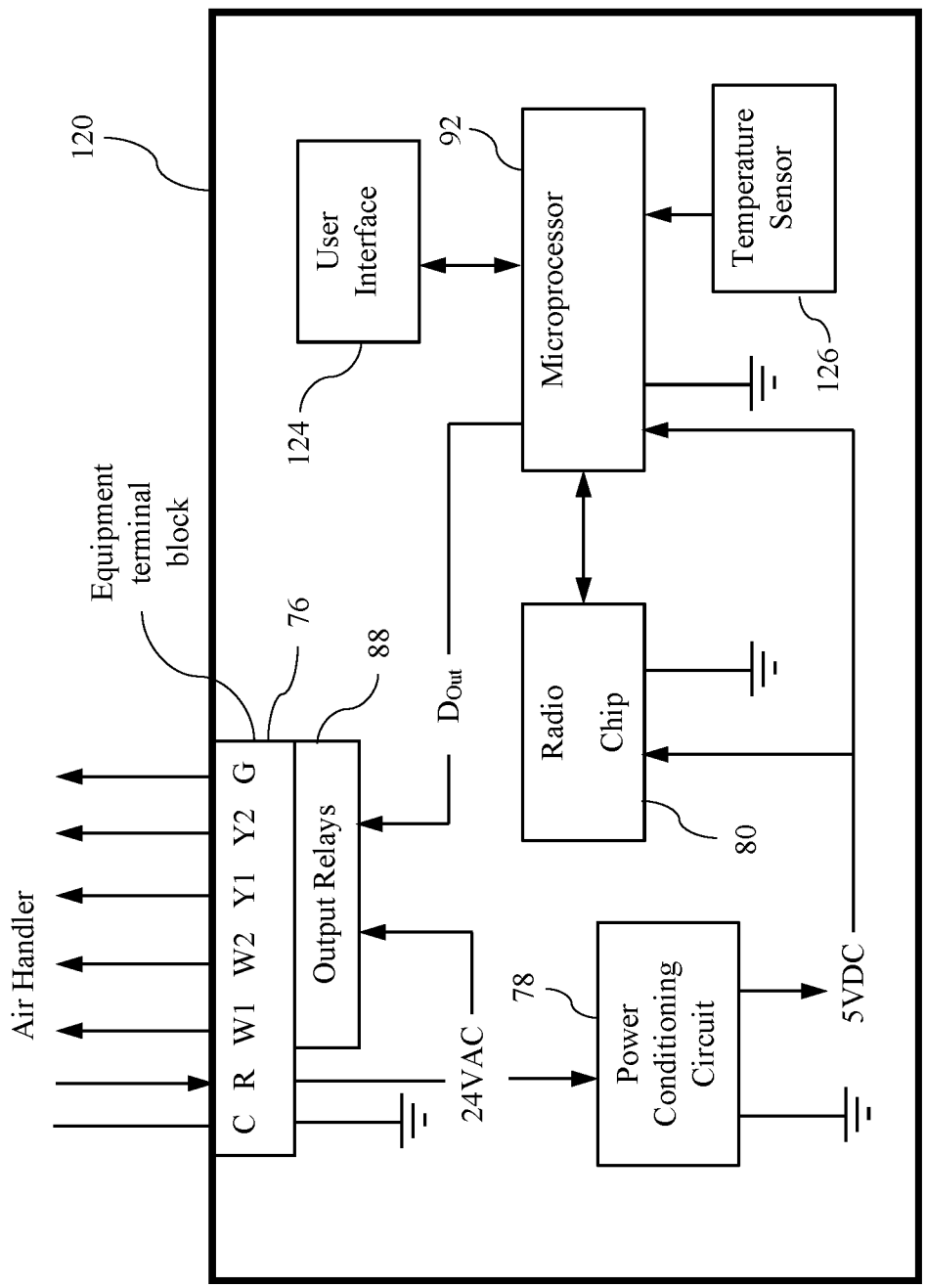
FIG. 11 is a schematic diagram of the specially adapted thermostat of FIG. 10.

FIG. 11 illustrates the internal structure of the adapted thermostat 120. Adapted thermostat 120 includes an equipment terminal block 76 for connecting to the air handler 20. This is structured the same and operates the same as the equipment control terminal block of FIG. 5. As in the device of FIG. 5, a power conditioning circuit 78 transforms the 24VAC into whatever voltage is required by other circuits within the zoning interface module, such 5 volts direct current (5VDC). A radio chip 80 implements at least one of the radio standards accessible by the home automaton hub 60, such as Zigbee, Zwave, Bluetooth, or Wifi. Alternatively, the zoning interface module may be configured to communicate with the hub via a wired interface, such as ethernet.

Adapted thermostat 120 may include a user interface 124 which allows a user to set operating mode (heat, cool, auto, off), fan mode (auto, on) and heating and cooling setpoints. Alternatively or additionally, these may be set via the hub while communication is available. A temperature sensor 126 measures a current temperature. Microprocessor 82 compares the current temperature to the setpoints and determines an operating state (heat call, cooling call, fan call, idle). When communication with the hub is available, adapted thermostat 120 sends the operating state to the hub and receives an equipment operating state from the hub which is sent to the equipment via output relays 88 and equipment terminal block 76. The equipment operating state received from the hub may be the same or may be different than the computed operating state sent to the hub. When communication with the hub is not available, the determined operating state is communicated to the equipment via relays 88 and equipment terminal block 76. As with the former embodiment, the hub may send a signal periodically, for example, every 15 minutes, to the adapted thermostat to indicate that communication is available. The adapted thermostat determines whether or not communication is available based on whether such a signal has been received recently, for example, within the last 20 minutes.

What is claimed is:

1. A zoning interface module comprising:
    a wired air handler interface configured to send output signals to an air handler;
    a wired thermostat interface configured to receive input signals from at least one thermostat;
    a wired zone damper interface configured to selectively send power to a plurality of zone dampers;
    a home automation interface configured to communicate with a home automation hub;
    a processor programmed to:
        establish and maintain communication with the home automation hub;
        in response to successfully establishing communication with the home automation hub, receive zone selections and the output signals from the home automation hub;
        in response to failure to establish and maintain communication with the home automation hub, determine the zone selections and the output signals based on the input signals using a default control strategy;
        send the output signals to the air handler via the wired output interface; and
        activate the selected zones using the wired zone damper interface.

2. The zoning interface module of claim 1 wherein the wired air handler interface is further configured to receive power from the air handler.

3. The zoning interface module of claim 2 wherein the wired thermostat interface is further configured to send power to the at least one thermostat.

4. The zoning interface module of claim 1 wherein the processor is further programmed to, while communication is established with the home automation hub, receive configuration parameters for the default control strategy from the home automation hub and store the parameters for later use when communication with the home automation hub is not available.

5. The zoning interface module of claim 1 wherein the processor is further programmed to forward the input signals to the home automation hub.

6. The zoning interface module of claim 1 wherein the home automation interface is a wireless interface.

7. A method of controlling a zoned heating and/or cooling system, the method comprising:
    receiving input signals from at least one thermostat via a wired input interface;
    communicating with a home automation hub;
    in response to successfully establishing communication with the home automation hub, receiving output signals and zone selections from the home automation hub;
    in response to failure to maintain communication with the home automation hub, determining the output signals and the zone selections based on the input signals using a default control strategy;

sending the output signals to an air handler via a wired output interface; and activating the selected zones using the wired output interface;

wherein the input signals and output signals comprise a series of calls for heating, cooling, or fan, each call having a begin time and an end time.

8. The method of claim 7 wherein the default control strategy selects all available zones.

9. The method of claim 7 further comprising:

while communication is established with the home automation hub, receiving configuration parameters for the default control strategy from the home automation hub and storing the parameters for later use when communication with the home automation hub is not available.

10. A zoning interface module comprising:

a wired air handler interface configured to send output signals to an air handler;

a wireless home automation interface configured to communicate with a home automation hub;

a processor programmed to:

establish and maintain communication with the home automation hub;

in response to successfully establishing communication with the home automation hub, receive the output signals from the home automation hub and forward the output signals to the air handler via the wired output interface; and in response to failure to establish and maintain communication with the home automation hub, determine the output signals measuring a temperature and comparing the temperature to a setpoint received from a user interface of the zoning interface module and send the output signals to the air handler via the wired output interface.

11. The zoning interface module of claim 10 wherein the wired air handler interface is further configured to receive power from the air handler.

* * * * *